United States Patent [19]

Brunner

[11] Patent Number: 4,503,882
[45] Date of Patent: Mar. 12, 1985

[54] FLOW VALVE

[75] Inventor: Rudolf Brunner, Baldham, Fed. Rep. of Germany

[73] Assignee: Heilmeier & Weinhlein Fabrik fur Oel-Hydraulik GmbH & Co. KG, Fed. Rep. of Germany

[21] Appl. No.: 484,925

[22] Filed: Apr. 14, 1983

[30] Foreign Application Priority Data

Apr. 16, 1982 [EP] European Pat. Off. ........ 82103236.4

[51] Int. Cl.³ .............................................. F16K 17/18
[52] U.S. Cl. .................... 137/454.5; 137/493; 137/539.5
[58] Field of Search ............... 137/493, 539.5, 454.5

[56] References Cited

U.S. PATENT DOCUMENTS

| 844,003 | 2/1907 | Conrad | 137/454.5 X |
|---|---|---|---|
| 1,087,890 | 2/1914 | Rogers | 137/493 X |
| 2,459,326 | 1/1949 | Kremiller | 137/493 X |
| 2,827,283 | 3/1958 | Browne | 137/493 X |
| 3,092,137 | 6/1963 | Thieme | 137/493 |
| 3,411,422 | 3/1967 | Oberthur | 137/493.1 |
| 3,483,952 | 12/1969 | Cardwell | 137/493 X |

Primary Examiner—Robert G. Nilson
Attorney, Agent, or Firm—Kinzer, Plyer, Dorn & McEachran

[57] ABSTRACT

A flow valve with a flow passage which exhibits a working flow path (A) and a backflow path (R), having a pressure relief valve (18, 20) which consists of a spring-loaded closing device and a valve seat located to shut off the backflow path below a certain pressure limit, and with a back-pressure valve comprising a closing device and a valve seat, this closing device being removable from the valve seat by means of the working pressure, thus clearing the working flow path. In order to simplify the construction and to obtain a large cross-sectional passage area at a given external dimension of the valve housing, both flow paths are conducted via a common valve seat (18), and the closing device (20) can be moved away from the valve seat by means of working pressure which moves the closing device in the working flow direction (P) from its closing position (I), in which both flow paths are shut off, into a first open position (II), in which the closing device clears the working flow path, and furthermore, the closing device can be moved away from its closing position (I) to the backflow direction (L) by means of the backflow pressure, thus pushing it against the tension of a spring into a second open position (III) in which it clears the backflow path (B).

11 Claims, 1 Drawing Figure

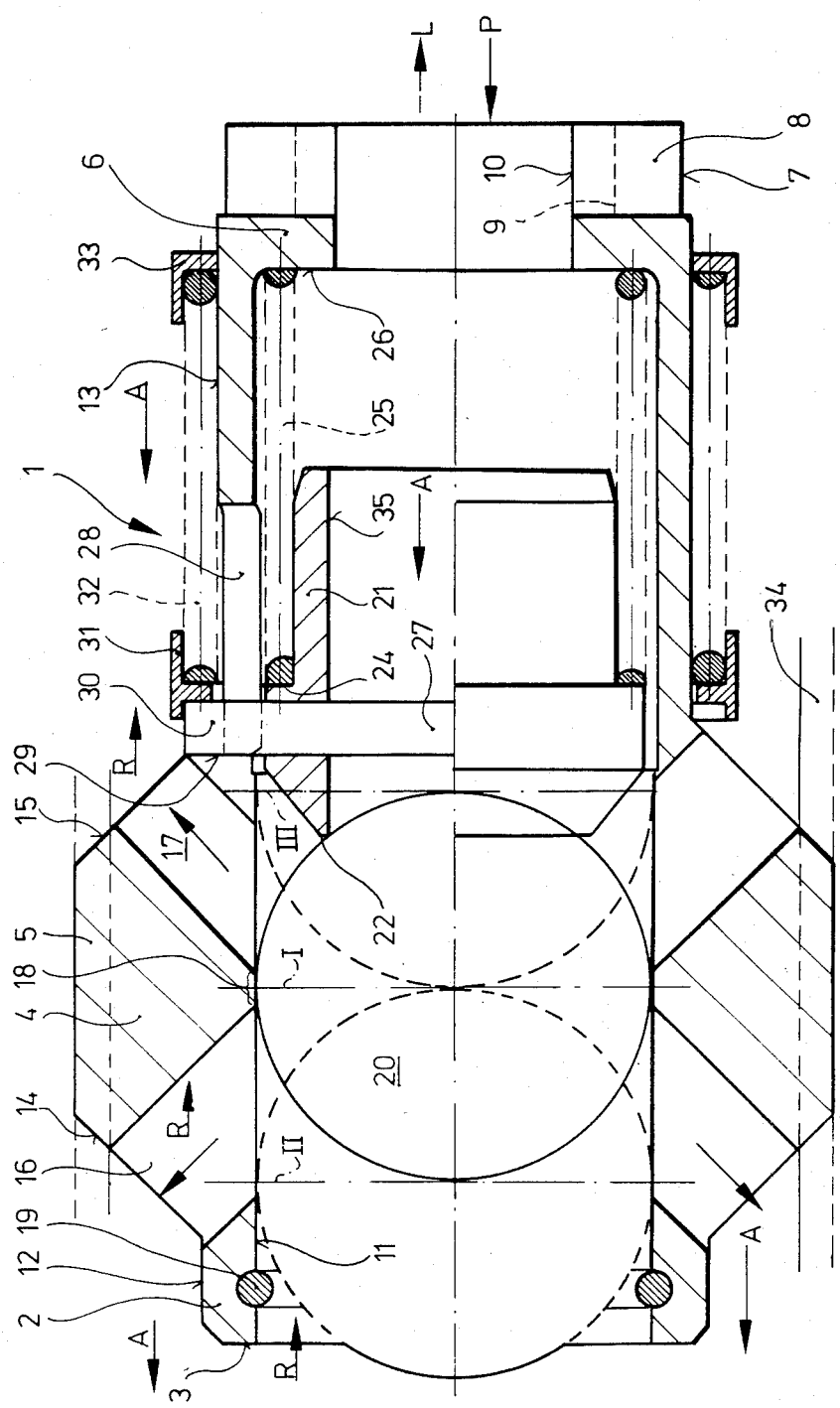

FLOW VALVE

DESCRIPTION

The subject of this invention is a flow valve with a flow passage which exhibits a working flow path and a backflow path, with a pressure relief valve which consists of a spring-loaded closing device and a valve seat; this pressure relief valve is located in the backflow path (R) and blocks the backflow path below a certain pressure limit; the flow valve also has a back-pressure valve, consisting of a closing device and a valve seat, which is located in the working flow path (A); this back-pressure valve can be moved away from the valve seat by means of the working pressure, thus opening the working flow path.

These types of flow valves are frequently built into a flow channel which leads to a user outlet and in which the hydraulic medium flows in one direction when the working pressure is on and in the other direction when the backflow pressure is on. In one practical application, such a flow valve is built into the cylinder bottom of a lifting cylinder in a forklift; in this context, it is important to ensure that the working flow path has a large section passage and that the flow resistance in the flow valve is as low as possible, in the backflow direction, and that the hydraulic medium be allowed to flow back only when a certain pressure limit has been reached. In this connection, the pressure relief valve plays an important role as a safety device; if the lifting element of the forklift gets caught, it must prevent the lifting cylinder from engaging automatically, due solely to the load of its piston and its piston rod, since otherwise the lifting element might fall down after it is released. At the same time, it is desirable that the cross-sectional area of passage be as large as possible. The cross-sectional area of passage in the flow passage is limited at the top by the dimensions of the flow channel, thus necessitating a compact construction of the flow valve.

A flow valve such as described according to the present disclosure is produced and distributed as Type SVC by the patent applicant. In this flow valve, the pressure relief valve is spatially separated from the back-pressure valve. Moreover, the working flow path is arranged separately adjacent to the backflow path. This can result in a cumbersome constructional design for both valves, but also in a limitation of the usable cross-sectional passage areas for both flow paths.

It is therefore the goal of this invention to create a flow valve of the type mentioned in the introduction which is simple and compact in its constructional design and which also exhibits a large cross-sectional passage area in both flow directions.

According to this invention, the task is solved in such a way that both flow paths are conducted via a common valve seat, with a closing device which works together with the valve seat, that can be moved away from the valve seat and out of its closing position in which it blocks off both the working flow path as well as the backflow path, by means of the working pressure, thereby moving the closing device in the directions of the working flow into a first open position in which it clears the working flow path, and in such a way that the closing device can be moved out of its closing position by means of the backflow pressure, with the closing device moving in the direction of the backflow and against the tension of the spring, into a second open position in which it clears the backflow path.

The advantages obtained from the design according to this invention are mainly due to the fact that a single valve, consisting of a valve seat and a closing device, is responsible for the two valve functions. Since, unlike the standard arrangement, the valve flow is undivided and the two valves need not be arranged side by side, the cross-sectional passage area can be designed to be optimally large in both flow directions. In the direction of the working flow, the closing device is moved from its closing position into its first open position, in which it completely clears the working flow path. In the direction of the backflow, on the other hand, the closing device is moved out of its closing position against the tension of a spring in the direction of its second open position as far as the existing backflow pressure requires. Once the backflow pressure begins to drop below the predetermined pressure limit, the spring moves the closing device into its closing position once again, thus making the closing device function as a back-pressure valve which shuts off the flow in the direction of the backflow. Unlike the normal and well-known arrangement, the invention provides that the closing device with the valve seat functions as a back-pressure valve only below a predetermined pressure limit, whereas according to the well-known arrangement, the back-pressure valve shuts-off the flow throughout the entire range of the backflow pressure.

One practical example of this invention, whose fundamental structure has an external screw thread and is in the shape of a hollow cylinder and which can be screwed into the flow channel, is characterized by the fact that the fundamental structure is designed in such a way that the external diameter on both sides of an external screw thread section, which is limited in length, is decreased, that the external screw thread section separates the two flow channels from each other which lead from both sides into the internal drilled passage of the fundamental structure, and that the wall of the internal drilled passage between the internally located mouths of the flow channels forms the valve seat, which has the shape of a cylindrical surface, for the closing device which is arranged within the internal drilled passage in a sliding seat. From the standpoint of manufacturing technology, this is a very useful construction. Moreover, due to this construction, the conditions of flow in both flow directions and for both flow paths are simple.

Another practical example of this invention offers additional advantages; it is characterized by the fact that it has a stop-motion device which limits the admission lift of the spring of the closing device when this closing device is in its closing position. This construction ensures that the closing device always remains in the closing position both prior to a pressure build-up as well as after a pressure drop, and that the spring does not move this closing device out of the closing position in the direction of the first open position.

Yet another modification of this invention, in which the closing device is a ball, offers favorable flow conditions as well as advantages in its manufacturing technology.

Moreover, it is useful for the fundamental structure to be equipped with a slidable sleeve to which a valve seat for the closing device is attached; when in the closing position and during movements into the and out of the second open position, the closing device rests close to the valve seat; the sleeve is activated by the spring. The spring does not directly act upon the closing device, but through the intermediate function of the sleeve which is able to appropriately center the spring. Moreover, by means of its internal section, the sleeve forms one section of the working flow path. Another favorable aspect is that the sleeve is braced against the stop motion device with a particularly high degree of precision whenever the closing device has arrived in its closing position, thus ensuring that the force of the spring is no longer in effect.

Another practical example, which is advantageous both from the standpoint of its construction as well as its installation technology, is characterized by the fact that the sleeve exhibits a transversal extension which engages a longitudinal slit in the fundamental structure, with this slit containing a stop-motion device. Within this slit, the motion of the sleeve can be guided with great accuracy.

In the case of the practical example in which the extension is a radial pin, the flow valve assembly is particularly simple; the pin passes diametrically through the fundamental structure section, whose diameter is smaller than that of the external screw thread section, and is positioned in the sleeve.

In consideration of the fact that the cross-sectional passage area is to be as large as may prove desirable and that the pressure relief valve can still be set for practically any pressure limit desired, yet another modification of the invention has been designed in which the ends of the radial pin project beyond the external diameter of the fundamental structure section, and an additional spring, which is attached along the outside of the fundamental structure section, is braced against the ends of the pin. In this case, the closing device is loaded by means of two springs, each of which can be relatively delicate in spite of the fact that the pressure of admission is rather high as a whole. Moreover, two springs of this type mounted in parallel result in a desirable spring resistance and a uniform reaction.

It is particularly easy to realize the goal described above, as far as the constructional design is concerned, by arranging the additional spring between two annular bearing brackets for the spring, with one of the bearing brackets being movably braced against the ends of the pin, with the other bearing bracket against the section.

Another useful practical example of this invention provides for a design according to which the transitions from the external screw thread section to the fundamental structure sections, which have a smaller external diameter, are present as annular shoulders, preferably as sloped annular shoulders, and in which each flow channel is formed by many drilled passages in the annular shoulders, these drilled passages being distributed in the circumferential direction and positioned diagonally to the valve seat. This design provides not only for a desirably large cross-sectional passage area in both flow directions, but also for defined flow conditions with a flow resistance which is insignificant. Moreover, the manufacture of this particular flow valve example is simple, particularly as far as the fundamental structure thereof is concerned, which may be either a machined or a cast part.

Yet another significant concept has been realized in still another modification of this invention, which is characterized by the fact that at the front end of the fundamental structure a drilled extension with a receptacle, e.g., a transverse slit, for a screw mechanism is provided. This makes it easier to screw the flow valve into a flow chanel which is equipped with an interior screw thread.

This particular modification of the invention also provides for flat sections along the external periphery of the extension; these flat sections preferably face each other diametrically and form shoulders which recede from the free end of the extension. These receding shoulders ensure that the hydraulic medium can flow back and forth even if the connector for the hydraulic medium projects too far toward the flow valve into the flow channel behind the flow valve (Ermetto threaded joint).

And finally, yet another advantageous modification of this invention is characterized by the fact that the fundamental structure exhibits a drilled passage which extends from the front end up to the drilled extension; this drilled passage corresponds at most to the external diameter of the closing device. It is also characterized by the fact that a removable safety mechanism for the closing device is located in the end of the drilled passage facing the front end. In this particular case manufacture is particularly simple since it suffices to create a continuous drilled passage through the fundamental structure starting at one of the front ends; this drilled passage forms both the valve seat as well as the sliding guide for the closing device and the flow paths. The closing device can be simply inserted into this drilled passage. The safety mechanism ensures that the closing device does not drop out accidentally. However, it can be exchanged very easily by simply removing the safety mechanism.

The following section explains this invention on the basis of a practical example which is shown in the drawing as a longitudinal section.

A flow valve (1) exhibits a fundamental structure (2) which consists of a hollow cylinder whose internal drilled passage, starting from one front end (3), is designated as (11). The fundamental structure (2) exhibits an external screw thread section (5) which is limited in length and which borders on a larger extension area (4); along both sides of this extension area, fundamental structure sections (12) and (13), with a distinctly decreased external diameter are located. The transitions from the external screw thread area (5) to the fundamental structure sections (12) and (13) are designed as sloped annular shoulders (14), (15).

At the end of the fundamental structure (2) which faces away from the front end (3), an annular flange (6) projects inward, which upon its external surface exhibits an extension (7) with a transverse slit (8) as a receptacle for a screw mechanism. The extension (7) may, for instance, be equipped on both sides with flat sections (9) which form shoulders which recede from the free front end of the extension (7). The extension (7) is traversed by a drilled hole (10) which leads to the internal drilled passage (11). If desired, this drilled hole (10) may be designed as an internal hexagon in order to make it easier to screw in the fundamental structure (2). In this case, the transverse slit (8) is not required.

By means of its external screw thread section (5), the flow valve (1) is screwed into a flow channel (34) which has an internal screw thread, with the screw threads which are engaged providing a seal in the axial direction.

Diagonal flow channels (16, 17) are distributed within the sloped annular shoulders (14, 15) in the circumferential direction, with these channels preferably having the form of several drilled holes. The internally located mouths of these drilled holes (16, 17) delimit a valve seat (18), which is formed by the wall of the internal drilled passage (11) as a cylindrical surface.

Within the internal drilled passage (11), a slidable closing device (20) is provided in the form of a ball and secured by means of a ring (19). The external diameter of this ball approximately corresponds to the internal diameter of the internal drilled passage (11); in this way, a freely sliding seat exists for the ball (20). In the interior of the fundamental structure section (13), a sleeve (21) is housed in such a way that it can slide back and forth; at its end facing the closing device (20), this sleeve forms a valve seat (22) against which the closing device (20) can rest.

At the outside of the sleeve (21), a shoulder (24) is provided as a bearing bracket for one end of a spring (25), whose other end is braced against the ring flange (26). The sleeve (21) has drilled hole (35) which extends in the longitudinal direction. It is traversed by a pin (27) which penetrates radially and whose ends (30) project through longitudinal slits (28) provided in the fundamental structure section (13). The ends of the longitudinal slits (28) which face the valve seat (18) form stop-motion devices (29) for the radial pin (27), and thus stop the motion of the sleeve (21) in the direction of the valve seat (18).

Along the external circumference of the fundamental structure section (13), a first annular bearing bracket (31) for a spring is attached in such a way that the bracket can slide; the end of the spring is braced against the bearing bracket, with its other end braced against the other bearing bracket (33), which is also annular and which is either secured tightly to the fundamental structure section or bracket (33) may be movable in the longitudinal direction for adjusting the rate of spring 32. The bearing bracket (31) is located at the ends (30) of the radial pin (27).

The stream through the flow valve (1) passes in the direction of the working flow designated as (P), with the letters (A) marked by arrows stressing those sections of the flow passage which form the working flow path. In the opposite flow direction, designated as L, the flow through the flow valve (1) represents the backflow. The letters B marked by directional arrows point to those sections of the flow passage which form the backflow path.

The stop-motion devices (29) are arranged in such a way that, under the force of the springs (32) and (25), the sleeve (21) can be moved in the direction of the valve seat (18) such that the closing device (20), positioned adjacent to the valve seat (22), cooperates with the valve seat (18) to shut off the flow. From this closing position, which is designated as I, the closing device (20) can be freely moved into a first open position II whereas to realize the second open position III it can be moved against the tension of the springs (25) and (32).

The flow valve (1) operates in the following manner:

When pressure is built up in the working flow direction, this pressure acts upon the closing device within the valve seat (22) if the closing device (20) is in the closing position I as well as via the flow channels (17), on the surface area of the closing device which surface area is located outside the valve seat (22). Thus, the closing device (20) is moved into the first open position II in which the flow channels (16) are fully open. The closing device (20) is either adjacent to the safety retaining device (19) or to a stop-motion device, not shown here. The hydraulic medium flows through the internal drilled hole (35) of the sleeve (21), through the flow channels (17), and finally reaches the consumer via flow channels (16). The sleeve (21) is pressed against the stop-motion devices (29) via the radial pin (27) and is not able to flow the movement of the closing device (20).

As soon as a backflow occurs, a dynamic impulse is received by the closing device (20); this impulse first moves the closing device now in position II back into closing position I, where it is intercepted by the valve seat (22). Below a certain backflow pressure limit, this limit being determined by the force of the initial stress of the springs (25) and (32), the closing device (20), together with the valve seat (18), forms a back-pressure valve which prevents any backflow whatsoever. Only once the backflow pressure has increased to the extent that it is able to overcome the force of the springs (25) and (32) via the closing device (20) does the closing device (20 move the sleeve (21) in the direction of the extension (7) and thus gradually opens the passage to the flow channels (17). In this context, the flow path through the internal drilled hole (35) of the sleeve (21) continues to remain closed. Via the sleeve (21) and the radial pin (27), as well as the bearing bracket (31), the external spring (32) is compressed at the same time. As soon as the backflow pressure decreases below the limit previously mentioned, the springs (25) and (32) push the closing device (20) back into closing position I, thus ensuring that no further flow can take place.

It is obvious that the design of the flow valve can be simplified by providing only a single spring to stress the closing device; this spring may be arranged either inside or outside of section (13). In addition, it is also possible for the closing device to be stressed by a weak spring in the direction of the valve seat (22); this spring always keeps the valve seat in its closing position I if no admission pressure exists. A simplified version of this practical example of the invention provides for the omission of the sleeve (21); in this case, the internal spring (25) acts directly upon the closing device (20). The internal drilled passage (11) must then have appropriate motion-stopping devices which ensure that the admission lifting motion of the spring (25) is limited.

I claim:

1. Flow valve structure for both pressure flow and backflow with an external periphery having an internal bore through which extends a flow passage which exhibits both a working flow path (A) and a backflow path (R), this valve comprising a spring-loaded closing device in the form of a ball opposed to a valve seat (18) which blocks the backflow path once the working pressure has fallen below a certain pressure limit and positioned in the working flow path and by which it is possible for this closing device to be moved away from the valve seat by means of the working pressure, thus clearing the working flow path, characterized by the fact that both flow paths (A,R) are conducted via a common valve seat (18) and that the ball closing device (20) can be moved away from its closing position (I) at valve seat (18), which blocks both the working flow path as well as the backflow path, into a first open position (II) in which the ball clears the working flow path, this movement being directed in the working flow direction (P) and being activated by the working pressure, and by the fact that a spring means (32) opposes movement of the closing ball out of its closing position (I) into a second open position (III) by means of the backflow pressure which is directed in the backflow direction against the tension of the spring means, with the closing device clearing the backflow path R when in this second open position (III); further characterized by the fact the external periphery includes a thickened section (4) neighbored on at least one side by a section of reduced diameter, and that the working flow path includes a channel for pressure flow through the thickened section communicating with the bore; and further characterized in that the ball in its first open position (II) is at a stop position in the bore by which said flow channel through the thickened section is substantially fully open, and that the spring means opposing the ball, in its extended state, engages a stop means (29) so that the ball in position (I) is free of the spring force to move freely to position (II).

2. Flow valve structure according to claim 1 which can be screwed into a flow channel (34) by means of an external screw thread (5), characterized by the fact that on both sides of the external screw thread section (5) of limited length, the valve structure (2) has a reduced external diameter, that the external screw thread section (5) separates two flow channels (16, 17) from each other which are directed from both sides of the external screw thread section (5) into the internal bore (11) of the valve structure (2), and that the wall of the internal bore between the internal mouths of the flow channels (16, 17) forms the valve seat (18) in the shape of an annular surface for seating the closing device (20) which is opposed in the internal drilled passage to a sliding sleeve presenting a valve seat (22).

3. Flow valve according to claim 2, characterized by the fact that there are transitions (14, 15) from the external screw thread section (5) to valve structure sections (12, 13), which have a smaller external diameter presenting annular shoulders, and by the fact that each flow channel (16, 17) is formed by many drilled holes in the annular shoulders, these drilled holes being distributed in the circumferential direction and positioned diagonally to the valve seat (18).

4. Flow valve according to claim 3, characterized by the fact that at the front end of the valve structure (2) a drilled extension (7) with a receptacle (8), for a screw mechanism is provided.

5. Flow valve according to claim 4, characterized by the fact that the external periphery of the extension (7) has provisions for flat sections (9) which face each other diametrically and which form shoulders which recede from the free end of the extension.

6. Flow valve according to claim 5, characterized by the fact that the valve structure (2) exhibits a drilled passage (11), which extends from the front end (3) up to the drilled extension (7) and whose internal diameter corresponds at most to the external diameter of the closing device (20), and by the fact that a removable safety mechanism (19) for the closing device (20) is located in the end of the drilled passage facing the front end (3).

7. Flow valve according to claim 1, characterized by the fact that within the valve structure (2) a slidable sleeve (21) is arranged to which a valve seat (22) for the closing device (20) is attached, this valve seat being in contact with the closing device (20) both in the closing position (I) and during movements into and out of the second open position (III), and by the fact that a spring (25) biases the sleeve (21).

8. Flow valve according to claim 7, characterized by the fact that the sleeve (21) exhibits a crosswise extension which engages a longitudinal slit (28) in the valve structure (2), with this slit containing the stop-motion device (29).

9. Flow valve according to claim 8, characterized by the fact that the extension is a radial pin (27) which passes diametrically through the valve and which is positioned in the sleeve (21).

10. Flow valve according to claim 9, characterized by the fact that the ends (30) of the radial pin (27) project beyond the external diameter of the valve structure, and that an additional spring (32) is attached along the outside of the valve structure section against the ends (30) of the pin.

11. Flow valve according to claim 10, characterized by the fact that the additional spring (32) is arranged between two annular bearing brackets (31 and 33) for the spring.

* * * * *